United States Patent [19]
Bradley et al.

[11] Patent Number: 4,631,670
[45] Date of Patent: Dec. 23, 1986

[54] INTERRUPT LEVEL SHARING

[75] Inventors: David J. Bradley, Boca Raton; William B. Ott, Lake Worth, both of Fla.

[73] Assignee: IBM Corporation, Armonk, N.Y.

[21] Appl. No.: 629,868

[22] Filed: Jul. 11, 1984

[51] Int. Cl.⁴ .............................................. G06F 9/46
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 3,597,743 | 8/1971 | Murphy et al. | 364/200 |
| 3,665,415 | 5/1972 | Beard et al. | 364/200 |
| 4,035,780 | 7/1977 | Kristick et al. | 364/900 |
| 4,040,028 | 8/1977 | Pauker et al. | 364/200 |
| 4,041,471 | 8/1977 | Krossa et al. | 364/200 |
| 4,090,238 | 5/1978 | Russo | 364/200 |
| 4,275,458 | 6/1981 | Khera | 364/900 |
| 4,420,806 | 12/1983 | Johnson et al. | 364/200 |

Primary Examiner—James R. Hoffman
Attorney, Agent, or Firm—Sughrue, Mion, Zinn, Macpeak & Seas

[57] ABSTRACT

An interrupt interface circuit for interrupt level sharing comprising a pulse generator having an open-collector or tri-state output connected to an external interrupt line shared by other similar circuits. An active internal interrupt signal causes the pulse generator to pulse. The external interrupt line is fed back and latched on a disabling input of the pulse generator so that any pulse on the external interrupt line prevents further pulsing. The software handler of the interrupt, upon servicing an interrupt of the interrupt level, causes the enabling of the pulse generators of that level, thereby permitting active internal interrupt signals to produce a further pulse. By this interrupt level sharing, phantom interrupts are eliminated and servicing overhead is minimized.

11 Claims, 6 Drawing Figures

INTERRUPT LEVEL SHARINGR

BACKGROUND OF THE INVENTION

The invention relates generally to computer systems. In particular, the invention relates to the sharing of an interrupt level by multiple interrupt sources.

A popular type of computer architecture allows multiple users to asynchronously request the service of a resource that is to be used exclusively by the source. One example of the resource is the processor and I/O channel of the computer system. Several I/O devices are attached to the I/O channel and have sufficient intelligence to execute tasks independently of the processor. However, at random times the I/O devices require communication with the processor. In this case, a request is sent to the processor requesting service by the processor. When the processor interrupts its own processing and honors the request, the details of the service request and possibly a response are conveyed on the I/O channel. It is, however, to be understood that the architecture associated with service requests and interrupt is more general than the situation just described.

One method of servicing these asynchronous requests for service is to have the processor periodically poll all the devices attached to the I/O channel to determine if the device requires service. This method though has several drawbacks. There is a high overhead associated with the polling because the poll must be periodically performed even if there are no outstanding requests. Furthermore, in order to reduce the overhead to a reasonable level, the repetition rate for the polling is made relatively long. As a result, though, the response to a service request becomes slow. In the usual situation, the I/O device making the service request cannot continue its own processing until the service request is serviced by the processor. As a result, system utilization falls with increased time between polls.

An alternative approach to polling is the use of interrupts or interrupt requests. A dedicated interrupt line is connected between the I/O device and the processor. Whenever the I/O device requires service, that I/O device outputs an interrupt signal onto the interrupt line. A separate interrupt terminal is provided on the processor and the processor, upon detecting an active interrupt line, goes into an interrupt servicing mode to service the request indicated by the interrupt signal. It should be emphasized that the interrupt signal is asynchronous with the operation of the processor and, indeed, is not necessarily synchronized with the processor clock if separate clocks are provided for the processor and the I/O device.

The computer architecture described above is satisfactory if there is only a single I/O device that is making interrupt request. However, it is more typical that there are several such I/O devices, each asynchronously requesting service by an interrupt signal. Indeed, the trend in modern computer architecture is for increasing intelligence contained in a large number of I/O devices. The communication to the processor, however, is performed over the I/O channel and requires the exclusive utilization of the processor and the I/O channel for the communication between the I/O device and the processor.

One conventional method of providing for multiple interrupt sources is to use a programmable interrupt controller. A popular programmable interrupt controller is the 8259 manufactured by the Intel Corporation and described in its publication "The 8086 Family Users Manual" dated October 1979 and available from the Intel Corporation in Santa Clara, Calif. This reference is incorporated herein by reference. The 8259 allows for eight interrupt levels. Each interrupt level has its own interrupt request line and the eight levels are prioritized among themselves. Whenever an interrupt request line indicates a request for service and the request does not conflict with a higher priority request, the 8259 outputs an interrupt signal on a single line to the processor that it supports. Along with the interrupt signal to the processor, the 8259 sends to the processor an interrupt vector associated with that interrupt level. The processor uses the interrupt vector to properly service the interrupt request.

For multiple interrupt sources, there is always the possibility that two interrupts for a service request are outstanding at a particular time. The 8259 prioritizes the outstanding requests and, possibly, the request currently being serviced. The highest priority request is serviced first, via the interrupt signal and interrupt vector to the processor, while the outstanding requests are held by the 8259. Thus, it is seen that the eight interrupt request lines to the 8259 function as separate interrupt levels. Apart from the prioritizing in the case of conflict, the eight different input levels are separable and each is operated similarly to the single interrupt level described above.

An important aspect of the use of the 8259 is the convention that an interrupt request signal to the 8259 transitions from a low to a high level to determine that an interrupt request has been received by the 8259. The convention further states that the interrupt request signal remains high until the request indicated by the interrupt has been serviced. It is a finite time $T_{ID}$ after the above described transition that the interrupt request line having the upward transition is measured to determine that it is still high. This measurement indicates which of the interrupt levels are currently asserted. It is to be noted that this high level measurement is redundant.

A single 8259 is thus designed to interface the interrupt request line for up to eight I/O devices. However, for modern computer systems this number turns out to be inadequate. For example, the Personal Computer (PC) of the IBM Corporation uses an 8259 as an interface for the interrupt request lines from the various additional boards plugged into the system or planar board housing the processor. Two of the eight interrupt request lines are, however, used for interrupts originating from the system board. The remaining six interrupt levels are lead to a bus connected to all the slots for additional I/O devices. Thus, there are an insufficient number of interrupt levels for a PC whose I/O slots are completely filled. In fact, some boards require more than one interrupt level. The problem is even worse because a particular board needs to be identified with a particular interrupt level. there are a large number of I/O boards, well in excess of six varieties, and the selection of the particular boards for a PC depends upon the user's needs. If the I/O boards are hard-wired for a particular interrupt level, the possibility arises that the selection of I/O boards is such that a large number of them are using the same interrupt level.

It would be possible, of course, to expand the number of interrupt levels, even with the continued use of the 8259. For instance, two or more 8259s can be used, as described in the previously cited Intel publication and also by Khera in U.S. Pat. No. 4,275,458. The difficulty with this approach is that it requires the number of interrupt lines that is equal to the number of interrupt levels. It is desirable to provide for additional interrupt sources without modifying the bus connecting the I/O slots to the system, that is, to continue with the use of only six interrupt levels.

It is possible to share an interrupt level, that is, that more than one interrupt source is somehow using the same interrupt level. In one version of the PC, the computer system can turn off the interrupt function on one or more boards. Thereby, two or more boards may be sharing an interrupt level but only one of them has an operable interrupt at any one time. This approach has the obvious disadvantage that some boards cannot always use their interrupt functions. Furthermore, its use depends upon the predictability of interrupts from particular boards. Such predictability is not assured and runs counter to the architecture of an interrupt driven system.

Another approach for interrupt level sharing is to provide the possibility of multiple boards outputting active interrupt level signals to a single interrupt request line and then to further provide software routines to determine which of the boards connected to that interrupt level is actually making the request. It is well known that TTL open-collector outputs can be used to share a single electrical line. Unfortunately, open collector outputs can assert a line only if the high level is non-asserted or inactive and the low level is asserted or active. Then, any low open-collector output will pull its connected line low regardless of the high output of any other open-collector output connected to that line. Such a convention is, unfortunately, inconsistent with the requirements of the 8259 which requires that the low state is inactive and the high state is active. A solution has been proposed by others to accommodate line sharing on the interrupt request inputs to the 8259. This circuit is illustrated in FIG. 1 in which the signal input to a tri-state buffer 10 is grounded. An enable input to the tri-state buffer 10 is connected to an internal interrupt signal 12. The output of the tri-state buffer 10 is connected to an external interrupt line 16 that has a pull-up resistor 14 to a voltage source equal to a high level for the logic circuit, for example, +5 V for TTL logic. When the tri-state buffer is not enabled, the pull-up resistor 14 pulls the output up to a high level, assuming that no other buffer connected to the external interrupt line 16 is pulling that line 16 low. However, when the tri-state buffer 10 is enabled by the internal interrupt signal, the output line 16 is grounded or put into the low state. The result can also be accomplished with an open-collector output of a TTL circuit.

Although it may appear that the negative pulse on the output line 16 has the wrong polarity for the 8259, in fact the 8259 responds to the positive transition 18 of the output signal and the output signal remains high following the positive transition to allow the identification of the interrupt level. Once the 8259 has detected the positive transition 18, it waits a time $T_{ID}$ before measuring the high level on the external interrupt line 16 to identify the interrupt level making the service request to the 8259. When that interrupt level is finally serviced, polling is performed by the system to determine which of the interrupt sources of that interrupt level has caused the interrupt.

There are several disadvantages to this approach. One of the most serious disadvantages is the possibility of a phantom interrupt. A phantom interrupt occurs when two interrupt sources of a particular level make closely timed interrupt requests as illustrated in FIG. 2. If the first interrupt source produces a negative pulse 20 on the external interrupt line 16 and then, in a time less than $T_{ID}$ following the upward transition 18, a second interrupt source produces a second negative pulse 22, when the 8259 measures the input levels on its interrupt request inputs, it detects a low or inactive level on the interrupt line 16 of this interrupt level. This situation of a measured low level following an upward transition on an interrupt request input does not conform to the convention for interrupts to an 8259. The 8259 is designed so that in such a situation, interrupt level 7 is indicated by default as the level requesting service even though this may not be the case.

The open-collector output approach has the further disadvantage that there may be two outstanding interrupt requests on the same external interrupt line. The second and subsequent requests are not explicity handled by the 8259. Once the positive transition 18 has been detected by the 8259, subsequent positive transitions have no effect until the 8259 recognizes the interrupt request on the interrupt line and forwards it to the processor. As a result, when the processor is responding to an interrupt request from a particular interrupt level, it is possible that more than one interrupt source of that interrupt level have an outstanding interrupt request. Thus the processor, once it has received an interrupt from the 8259, must poll every interrupt source of that level to determine which of them have outstanding requests. Furthermore, it is possible that the processor may be servicing one interrupt request on a particular interrupt level while a second interrupt source requests service. Thus, the only way that it is possible to determine that all outstanding interrupt requests on a particular interrupt level has been serviced is to not only poll each interrupt source of that level but to also to completely poll the sources of that level without finding an outstanding interrupt request. Needless to say, this approach exacts a high overhead for the processor.

SUMMARY OF THE INVENTION

Accordingly, it is an object of this invention to provide interrupt level sharing.

It is a further object of this invention to provide interrupt level sharing with a minimum of processor overhead.

It is yet another object of this invention to provide interrupt level sharing in which there are no phantom interrupts and in which interrupt requests are not lost.

A further object of this invention is to provide a method of interrupt level sharing that is transparent to the user and to the hardware of the user.

The invention can be summarized as an interrupt interface circuit for interrupt level sharing in which a pulse generator outputs an open-collector negative pulse to an external interrupt line, perhaps common to other interrupt interface circuits. The pulse generator is triggered by an internal interrupt signal that stays active until the internal interrupt is serviced. The pulse generator is inhibited from generating any further pulses by any pulse appearing on the external interrupt line, whether generated by this or another interrupt interface circuit of the same interrupt level. A port to the interface circuit from the processor servicing the interrupts provides a signal to remove the inhibition once the interrupt on that interrupt level has been serviced, thereby allowing the generation of previously inhibited interrupt pulses.

BRIEF DESCRIPTION OF THE PREFERRED EMBODIMENTS

Figure 1:
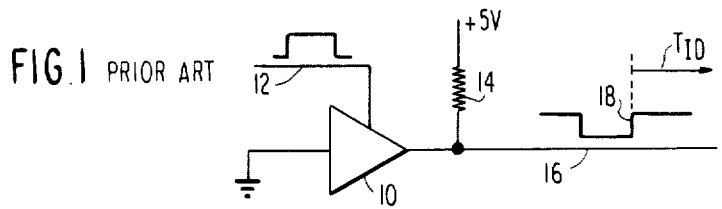
FIG. 1 is a circuit diagram of a prior art interrupt interface circuit.
Figure 2:
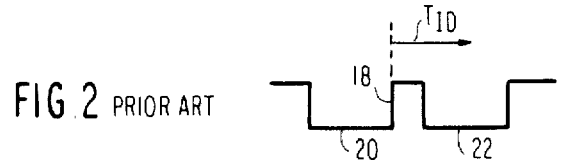
FIG. 2 is a timing diagram illustrating the cause of phantom interrupts in the prior art.
Figure 3:
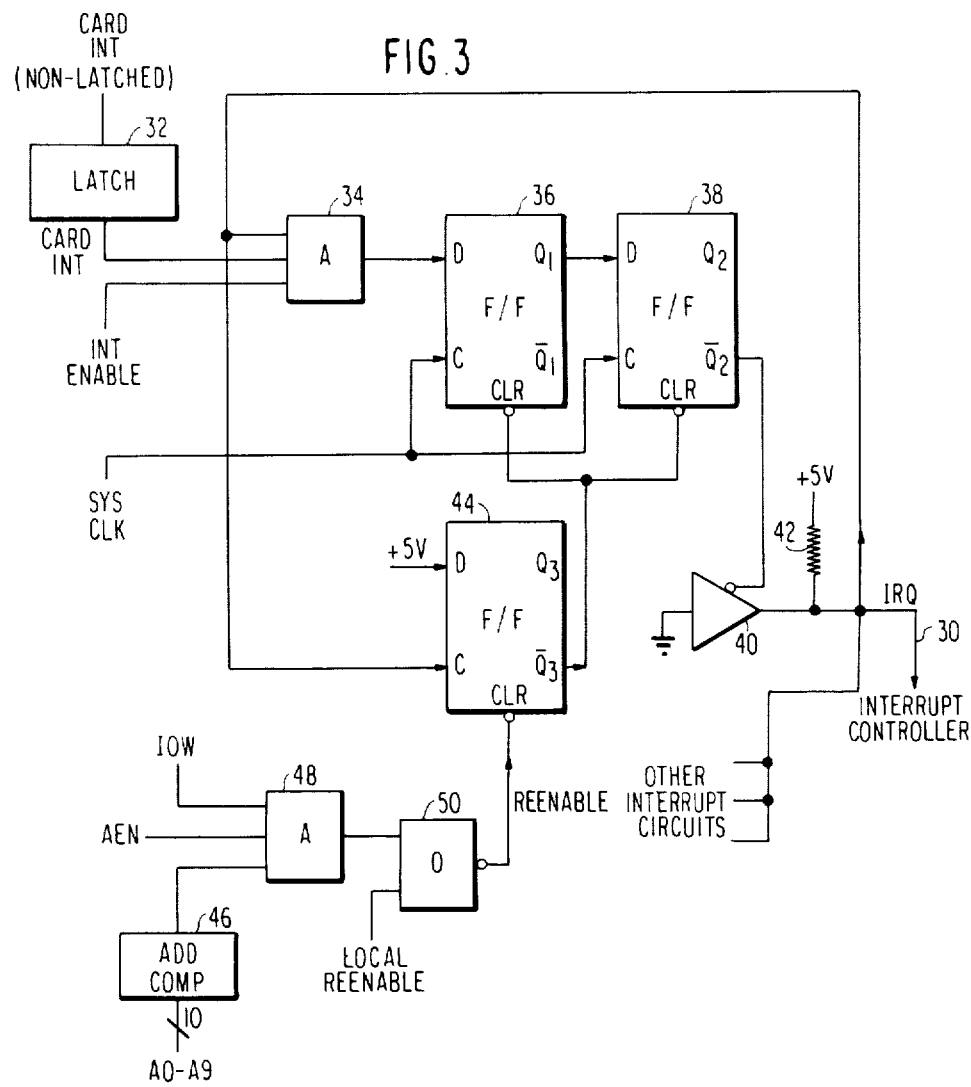
FIG. 3 is a schematic diagram of a clocked embodiment of the interrupt interface circuit of the present invention.
Figure 4:
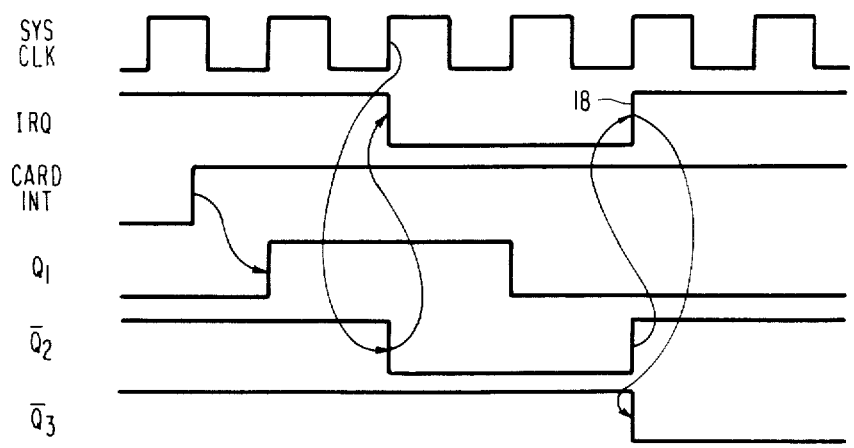
FIG. 4 is a timing diagram illustrating the operation of FIG. 3.

FIG. 3 is a schematic diagram of the preferred embodiment of the interrupt interface circuit of the present invention. The illustrated embodiment is designed for operation with a clocked system that is clocked by the system clock signal SYS CLK. At this point, assume that the signal IRQ on an external interrupt line 30 is in its high state, as illustrated in the timing diagram of FIG. 4. An internal interrupt signal CARD INT is in a low state when no interrupt is being requested by the card. However, CARD INT transitions to a high state when the card is requesting an interrupt and is held there by a latch 32, shown in FIG. 3. The latching function is usually provided by the logic circuitry providing the internal interrupt signal. The internal interrupt signal CARD INT and the external interrupt signal IRQ are combined in an AND gate 34. the third input to the AND gate 34 INT ENABLE is an extra feature possible with this invention, which will be described later. For the present, assume that INT ENABLE is high. In the presence of a high internal interrupt signal CARD INT and with the external interrupt signal IRQ being high, the AND gate 34 passes a positive signal to the data input of a D-type flip-flop 36 that has its clock input connected to the system clock SYS CLK. As a result, at the first upward transition of the system clock STS CLK following the upward transition of the internal interrupt signal CARD INT, the flip-flop 36 outputs on its positive output $Q_1$ a high signal, as illustrated in FIG. 4. This signal is passed to the data input of another D-type flip-flop 38, also with its clock input connected to the system clock SYS CLK. As a result, one clock period later a negative transition to a low level appears on the complemented output $\overline{Q}_2$ of the flip-flop 38. The complemented output $\overline{Q}_2$ is connected to the complemented control input of a tri-state buffer 40, such as a 74LS125, with its input grounded. The low level from $\overline{Q}_2$ thereby opens the tri-state buffer 40, and grounds the external interrupt line 30 to produce the signal IRQ shown in FIG. 4.

A feedback circuit is provided between the external interrupt line 30 to the AND gate 34 of this circuit as well as to all other similar interrupt interface circuits of this interrupt level. As a result, the low signal IRQ on the external interrupt line 30 disables the AND gate 34 and, one clock period later, as shown in FIG. 4, the $Q_1$ output of the flip-flop 36 goes low.

Then one clock cycle later, the complemented output $\overline{Q}_2$ of the flip-flop 38 goes high and, as a result, the tri-state buffer 40 is disabled and presents a high impedence to the external interrupt line 30. Assuming that no other interrupt circuit is grounding the external interrupt line 30, this line is left floating. However, a pull-up resistor 42 is connected between the external interrupt line 30 and a logic high voltage source, +5 V for TTL logic. As a result, the pull-up resistor 42 pulls the signal IRQ on the external interrupt line 30 to a positive high as illustrated in FIG. 4 (assuming that the external interrupt line 30 is not grounded by another interrupt interface circuit). The pull-up resistor 42 preferably has a resistance value of 8.2 kΩ which allows a reasonably rapid pull-up of the external interrupt line 30 yet still allows multiple pull-up resistors on the external interrupt line 30 associated with the other interrupt circuits. The positive transition 18 of the IRQ signal is the positive transition which is recognized by the 8259 as indicating a new interrupt request.

The signal IRQ on the external interrupt line 30 is also fed back to the clock input of yet another D-type flip-flop 44 that has its data input connected to a logic high voltage source, once again +5V. thus, the positive transition 18 that is recognized by the 8259 causes the complemented output $\overline{Q}_3$ of the flip-flop to go low. This signal $\overline{Q}_3$ is connected to the complemented clear inputs of the flip-flops 36 and 38. The continued low value of the $\overline{Q}_3$ signal disables the flip-flops 36 and 38 from producing any further pulses on the external interrupt line 30 regardless of possible new internal interrupt signals CARD INT. It is to be noted that this disabling occurs in the interrupt circuit of FIG. 3 even if this particular circuit was not the interrupt circuit producing the interrupt request IRQ on the external interrupt line 30. Thus, as soon as any one of the interrupt interface circuits attached to the external interrupt line 30, defined as the interrupt level of interest, outputs a negative pulse to the external interrupt line 30, no further interrupt requests are produced on the external interrupt line 30. However, the latch 32 continues to hold the internal interrupt signal CARD INT pending further action. It is also to be noted that the low pulse of the IRQ signal on the external interrupt line 30 disables the AND gate 34 so that any new internal interrupt request CARD INT appearing during the negative IRQ pulse is prevented from propagating to the pulse generator embodied in the flip-flop 38.

Figure 5:
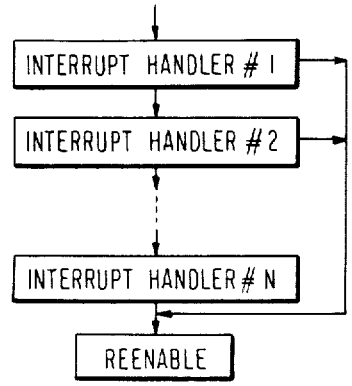
FIG. 5 is an illustration of the sequence of interrupt servicing by interrupt handlers.

The external interrupt line 30 is connected to one of the interrupt request inputs of the 8259. All interrupt circuits so connected to a particular 8259 interrupt input comprise a single interrupt level. The 8259 recognizes the positive transition 18 of the IRQ signal and makes the proper measurement of the high IRQ signal so as to determine which of the interrupt levels is requesting service. Because only a single IRQ pulse is allowed on the external interrupt line 30, there is no possibility of a phantom interrupt. Furthermore, the circuit of FIG. 3 does not process second and further pulses for that interrupt level. When an interrupt request is received by the 8259, it is possible that the request is not immediately serviced because there are higher priority requests outstanding. However, eventually the interrupt request of the particular interrupt level is serviced. Software must be provided which handles the interrupt for each interrupt source. For example, a series of interrupt handlers, illustrated in FIG. 5 are provided. There must be at least one interrupt handler for each interrupt interface circuit. Each interrupt handler queries its particular interrupt source to determine if it has an outstanding interrupt request. If the interrupt source does have an outstanding interrupt request, the interrupt handler performs some preassigned task. It should be noted that while only a single interrupt source produced the interrupt request IRQ, there may be several outstanding interrupt requests for the interrupt level. Once the interrupt handler has serviced an outstanding interrupt request, the interrupt handler turns off the internal interrupt signal CARD INT. At this point, two sequences of action are possible. The next interrupt handler in the chain of FIG. 5 can query its associated interrupt source for the existence of an outstanding interrupt request. Alternatively, the processor can terminate its handling of an interrupt signal from the 8259 after a single handling of an interrupt request. The choice between the two sequences depends upon the likelihood of two interrupt requests of the same interrupt level being outstanding concurrently, as balanced against the additional overhead of the polling of the additional levels of interrupt handlers.

The final step of servicing the interrupt request for a particular level is to reenable the interrupt interface circuits for that level. This can be performed by an I/O write to device address $02FX_H$ where X corresponds to the interrupt level. For instance, a command $OUT(02F7_H)$ causes a reenable signal to all the interrupt interface circuits of interrupt level 7.

The interrupt interface circuit of FIG. 3 has a port to the I/O channel containing the address bus for the addressed I/O device. The address bus is connected to an address comparator 46 which compares the address $A_0$–$A_9$ against an internal value, for example, $02F7_H$ for interrupt level 7. If all the comparisons are true, a high signal is sent to an AND gate 48. The address comparator 46 can be replaced by inverters attached to selected address lines $A_0$–$A_9$ for those address lines which would be zero or low for the present device. Then the address lines $A_0$–$A_9$, possibly passing through inverters, are all led to inputs of the AND gate 48. There are two additional inputs to the AND gate 48, an IOW signal indicating an I/O write operation and an AEN signal indicating that the write operation is the type used for the required I/O write rather than a direct memory access write.

The output of the AND gate 48 is connected through an OR gate 50 to the complemented clear input of the flip-flop 44. The function of the other input LOCAL RESET to the OR gate will be described later and is an improvement to the invention. The OR gate 50 has a complemented output so that, when the $OUT(02FX_H)$ operation addresses the interrupt level of the interrupt interface circuit, the flip-flop 44 is cleared. Barring any further pulses on the external interrupt line 30, the $\overline{Q}_3$ output goes high to remove the clear of the flip-flops of 36 and 38, thus reenabling them. Following the reenablement, any active internal interrupt signals CARD INT causes the production of an IRQ pulse on the external interrupt line 30.

The two extra features in the interrupt interface circuit of FIG. 3 will now be described. The interrupt enable input INT ENABLE to the AND gate 34 provides the means for disabling the interrupt of a particular interrupt interface circuit. Whenever the INT ENABLE signal is low, the output of the AND gate 34 is always low, thereby preventing the interrupt interface circuit from pulsing an interrupt request on the external interrupt line 30. This additional input makes the interrupt interface circuit compatible with software previously written for the PC in which there was no interrupt level sharing and the interrupt sources were selectively disabled from producing interrupt requests. This control is necessary in a compatible system where the interrupt mask register of the previously written software would disable all the shared interrupts. Of course, for full sharing of the interrupt level, the INT ENABLE signal is kept high.

The LOCAL REENABLE input to the OR gate 50 allows a single interrupt interface circuit to monopolize the shared interrupt facility. If an I/O device requires exclusive use of the shared interrupt level, it may effect this control by having its associated interrupt interface circuit disable all other devices. It is of course preferable that this exclusive use of the interrupt level be effected without knowing the details of the other I/O devices sharing the interrupt level.

to gain exclusive use of the shared interrupt, an I/O device causes an interrupt, perhaps under the control of the device handler in the system software. The interrupt handler, in servicing the interrupt request, does not reenable all the interrupt interface circuits of the interrupt level with the previously described $OUT(02FX_H)$, but rather causes a high LOCAL REENABLE. The LOCAL REENABLE is specific to a particular interface circuit and is generally not commonly conveyed to other interrupt interface circuits of the same interrupt level. The means of communication between the processor and the interrupt interface circuit for the LOCAL REENABLE signal can be an I/O port using components similar to the address comparator 46 and the AND gate 48. The interrupt handler would then issue an I/O write to a specific address to initiate the LOCAL REENABLE signal. The interrupt handler may also choose to revector the interrupt in the 8259 so that all interrupt requests detected by the 8259 are directed to the monopolizing interrupt interface circuit. As long as the interrupt handler does not issue the $OUT(02FX_H)$ write command, the monopolizing interrupt interface circuit will have exclusive use of the interrupts because the other interrupt circuits remain inhibited by the first negative IRQ pulse on the external interrupt line 30 and have not been subsequently reenabled. In order to reenable the other I/O devices, the device handler must reestablish the original interrupt vector and do the global reenable with an $OUT(02FX+_H)$ write instruction.

It should be pointed that the external interrupt line 30 is acting as a bidirectional line. The interrupt interface circuits both transmit IRQ pulses on the external interrupt line and also receive these pulses for feedback to the AND gate 34 and the flip-flop 44. As a result, the IRQ lines 30 cannot be redriven between the interrupt interface circuits comprising a shared interrupt level. All cards using the interrupt sharing mechanism must be in the same unit in the case where drivers are used between units. However, cards for different interrupt levels may occupy different boxes.

In the PC, the external interrupt line 30 is one of six lines of an interrupt bus. Each line of the interrupt bus is equivalent and defines the interrupt level.

Figure 6:
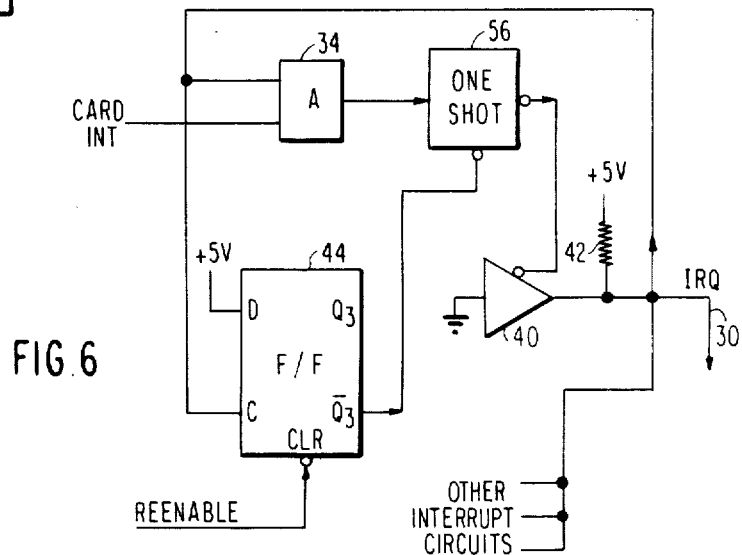
FIG. 6 is a schematic diagram of an unclocked embodiment of the present invention.

The interrupt interface circuit of FIG. 3 is for a clocked system. An equivalent interrupt interface circuit for an unclocked system is illustrated in the schematic diagram of FIG. 6. The flip-flops 36 and 38 of FIG. 3 are replaced by a one-shot 56 that has a complemented enable input connected to the complemented output $\overline{Q}_3$ of the flip-flop 44. The remaining elements are similar to those of FIG. 3. A positive output of the AND gate 34 causes the one-shot 56 to produce a negative pulse on the external interrupt line 30 as long as the one-shot 56 is not disabled by the flip-flop 44. A negative pulse on the external interrupt line 30 disables the one-shot 56 until the flip-flop 44 is reenabled. Thus, the operation of the interrupt interface circuit of FIG. 6 is seen to be the same as that of FIG. 3 except for the clocking. The I/O port for the reenable signal is not explicitly shown nor the added features of FIG. 3, which all can be copied from the clocked system.

Thus it is seen that the interrupt interface system of the present invention allows the sharing of an interrupt level by multiple interrupt sources. The interrupt level sharing can be accomplished at the card level, that is, at the interrupt source. Furthermore, the interrupt sharing is accomplished without hardware change to the external interrupt bus or to the 8259 programmable interrupt controller. However, the software of the interrupt handlers does require modification to provide the polling determination of which interrupt source has an outstanding request for service.

We claim:

1. In an interrupt system having an interconnection for an external interrupt signal, a shared interrupt interface circuit for permitting sharing of interrupt levels, comprising:
   pulse generating means for impressing on said interconnection a pulse transition to a first level from a second level, said interconnection being held at said first level if any such pulse generating means is impressing a first level on said interconnection;
   interrupt state means having an interrupt state and a noninterrupt state in response to an internal interrupt signal generated by a device requesting an interrupt, said state means causing said pulse generating means to generate said transition to said first level when said state means are in said interrupt state;
   inhibiting means responsive to a transition to said first level on said interconnection for inhibiting the generation of any subsequent first level signal by said pulse generating means; and
   reenabling means responsive to a single indicating an end of interrupt servicing for releasing the inhibiting by said inhibiting means.

2. A shared interrupt interface circuit as recited in claim 1, further comprising signal combining means connected to said interrupt state means and said interconnection for preventing said pulse generating means from initiating the generation of said first level signal when a first level signal is present on said interconnection.

3. A shared interrupt interface circuit as recited in claim 2, wherein said inhibiting means and said reenabling means together comprise a flip-flop, said flip-flop being connected to said interconnection and to a first line carrying said end of interrupt servicing signal, said flip-flop being set by said transition to said first level on said interconnection and being cleared by said end of interrupt service signal on said first line, the output of said flip-flop being connected to an enabling input of said pulse generating means.

4. A shared interrupt interface circuit as recited in claim 3:
   wherein said pulse generating means comprises output means having a first state of said first level, said first state being a voltage state, and a second state of high impedance; and
   further comprising voltage pull-up means connected to said interconnection for pulling the voltage on said interconnection to said second level when only high impedance output means are connected to said interconnection.

5. A shared interrupt interface circuit as recited in claim 4, further comprising an input port accessible by an addressable output function of a computer system, said input port connected to said line carrying said end of servicing signal, upon receiving a signal from said output function, and producing said end of servicing signal on said line.

6. A shared interrupt interface circuit as recited in claim 4, further comprising a computer system having an addressable output function and an input port accessible by said output function, said input port connected to said line carrying said end of servicing signal, upon receiving a signal from said output function, and producing said end of servicing signal on said line.

7. A shared interrupt interface circuit as recited in claim 6, wherein said output circuit selectively produces a low level voltage signal on said external interrupt line or presents a high impedance to said external interrupt line and further comprises a pull-up resistor connected between said external interrupt line and a positive voltage.

8. A shared interrupt interface circuit as recited in claim 1, further comprising an input port accessible by an addressable output function of a computer system, said input port receiving a signal from said output function producing said end of interrupt servicing signal.

9. A shared interrupt interface circuit as recited in claim 1, further comprising a computer system having an addressable output function and an input port accessible by said output function, said input port receiving a signal from said output function producing said end of interrupt servicing signal.

10. A shared interrupt interface circuit for a computer system operating with a clock and an external interrupt line and having an addressable output function, said computer system responding to an interrupt when the signal on said external interrupt line transitions from a first level to a second level, comprising:
   a signal combining gate receiving said interrupt line and an internal interrupt line, the signal on said internal interrupt line changing state when an interrupt is requested;
   a first flip-flop receiving the outputs of said signal combining gate and said clock;
   a pulse generating circuit receiving the output of said first flip-flop and clocked by said clock for producing a negative pulse on said external interrupt line, said pulse generating circuit having an output circuit that pulls said external interrupt line to said first level regardless of the outputs of other similar output circuits connected to said external interrupt line;
   a second flip-flop receiving the external interrupt line and having an output connected to disabling inputs of said first flip-flop and of said pulse generating circuit; and
   an input port accessible by said output function of said computer system, the output of said port connected to a disabling input of said second flip-flop.

11. A method of sharing interrupt levels, comprising the steps of:

gating an internal interrupt signal, indicating a request for interrupt from a device, with the signal on an external interrupt line, said internal interrupt signal being blocked by a first level signal on said external interrupt line;

setting a first clocked storage means with said gated internal interrupt signal;

generating, when said first storage means has been set, a clocked pulse transition from said second level to said first level on said external interrupt line, said external interrupt line being held at said first level whenever any first level signal is being impressed thereupon;

setting a second storage means with a first level signal on said external interrupt line;

disabling said first storage means and the generating of said first level with the output of said second storage means; and disabling said second storage means when interrupt servicing has been completed.

* * * * *